June 4, 1957     L. A. MACKLANBURG     2,794,219
DOOR SEALING THRESHOLD
Filed Nov. 14, 1955
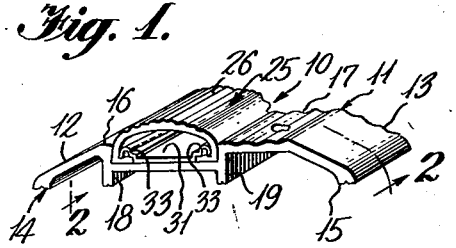
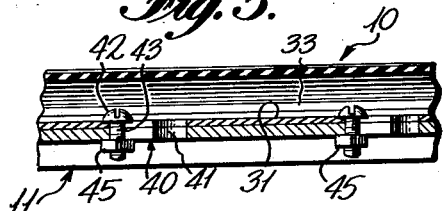
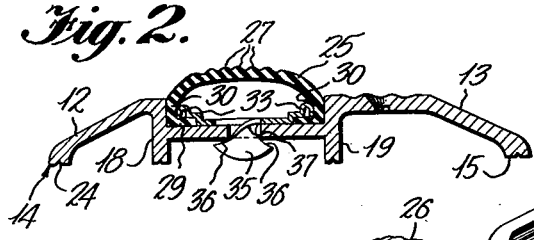
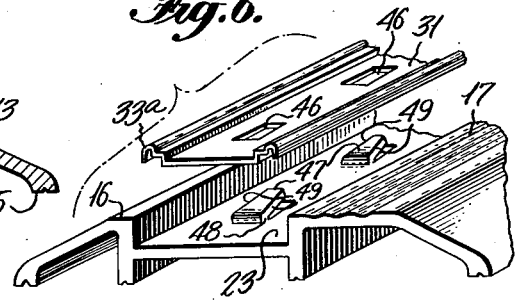
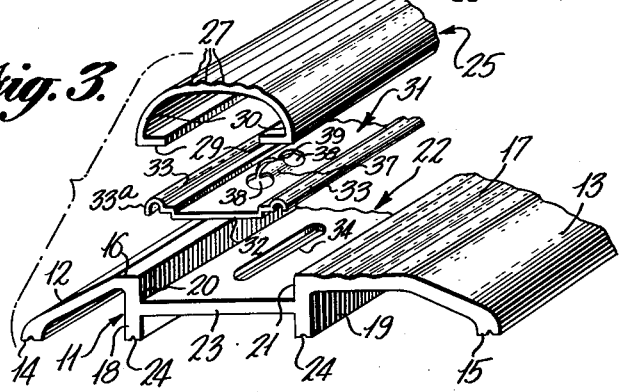
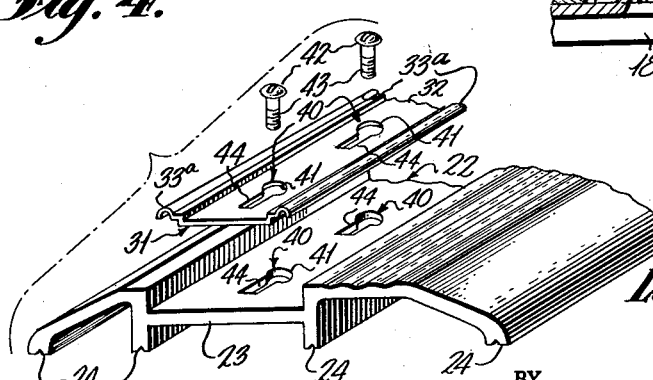
INVENTOR
Louis A. Macklanburg
BY Mason, Fenwick & Lawrence
ATTORNEYS

2,794,219

DOOR SEALING THRESHOLD

Louis A. Macklanburg, Oklahoma City, Okla., assignor to Macklanburg-Duncan Co., Oklahoma City, Okla., a corporation of Oklahoma Application November 14, 1955, Serial No. 546,680

7 Claims. (Cl. 20—64)

The present invention relates in general to thresholds, and more particularly to thresholds having provision to effect a weather-tight seal with the door when the latter is in a closed position.

Various weather-tight sealing provisions have been proposed or resorted to in the past to seal the lower edge portion of a door wherein a flexible sealing strip or body is held in a riser and projects or arches upwardly from the riser into engagement with the lower edge of the door. The flexible sealing strip or body is subjected to constant abrasion and scuffing and consequently gives rise to frequent replacement problems. Further, certain of the prior art sealing thresholds give rise to problems in assembly of the components and reliable retention of the sealing strip in assembled relation with the riser.

An object of the present invention is the provision of a novel door sealing threshold including a flexible sealing strip and a supporting riser structure which is simple in construction, easy to assemble, install and replace parts, and which efficiently and satisfactorily seals the lower edge of the door against weather.

Another object of the present invention is the provision of a novel door sealing threshold including an extruded supporting structure in the form of a riser and a removable arched resilient deformable sealing strip assembled with the supporting structure by a unique mounting structure facilitating assembly and replacement of the sealing strip.

Another object of the present invention is the provision of a novel retaining structure for removably securing a semi-cylindrical resilient elongated sealing strip along its lateral edges to an extruded threshold riser, wherein manufacture and assembly of the threshold and sealing strip is simplified and rendered more economical and replacement of the sealing strip is facilitated.

Other objects, advantages and capabilities of the present invention will become apparent from the following detail description taken in conjunction with the accompanying drawing illustrating several preferred embodiments of the invention.

In the drawing:

Figure 1 is a fragmentary perspective view of a door sealing threshold unit embodying the present invention;

Figure 2 is a transverse section view taken along the line 2—2 of Figure 1;

Figure 3 is an exploded fragmentary perspective view of the threshold illustrated in Figure 1, showing the condition of the components prior to interlocking the components together;

Figure 4 is an exploded fragmentary perspective view of a modified embodiment of a threshold riser and retaining plate;

Figure 5 is a transverse section view of the form shown in Figure 4;

Figure 6 is an exploded fragmentary perspective view of a further modified construction; and Figure 7 is a fragmentary vertical longitudinal section view of the form shown in Figure 6.

Referring to the drawing wherein like reference characters designate corresponding parts throughout the several figures, and particularly to the embodiment illustrated in Figures 1–3, the door sealing threshold unit of the present invention, indicated generally by the reference character 10, is embodied in a threshold riser or supporting strip 11 preferably formed by extrusion from a metal such as aluminum. The threshold riser 11 is in the form of a longitudinally elongate body adapted to be mounted in a door opening in the conventional manner at the bottom of a door opening and between the door frame jambs, and includes a pair of upwardly inclined approach walls 12, 13 rising from an inside bearing edge 14 and an outside bearing edge 15, respectively, to top tread wall portions 16 and 17.

The adjacent longitudinal edges of the top tread wall portions 16, 17 terminate in downwardly projecting integral reinforcing ribs 18, 19 terminating in lower edges lying in the plane of the inside and outside bearing edges 14 and 15. The upper portions of the reinforcing ribs 18 and 19 likewise define vertical side walls 20, 21 of a longitudinally extending channel 22 defined between the top tread wall portions 16, 17, the bottom wall of the channel 22 being formed by a bridge strip 23 which is integral with and extends between the reinforcing ribs 18 and 19 and joins the reinforcing ribs approximately mid-way of their height.

In accordance with conventional practice, the inside and outside bearing edges 14 and 15 and the lower edges of the reinforcing ribs 18 and 19 are provided with V-shaped grooves 24 cut therein so as to provide two longitudinal floor-engaging edges for each one of these four floor-engaging members to thereby minimize the possibility of water seepage along the floor beneath the threshold member 10 from the outside edge 15 to and beneath the inside edge 14. In accordance with conventional practice, calking will be applied along the internally disposed surfaces of the inside and outside edges 14 and 15.

The channel 22 provided in the threshold riser 11 is designed to removably receive a flexible sealing strip 25 of vinyl plastic, rubber, or like flexible material having an upwardly arched central portion 26 projecting upwardly above the top tread wall portions 16, 17 of the riser 11 from adjoining longitudinal edge portions 27. The purpose of the upwardly arching sealing strip 25 is to engage the lower edge of the door when the door approaches closed position and seal the space between the lower edge of the door and the riser 11 against ingress or egress of air and moisture. The sealing strip 25 is readily deformable so as to resiliently yield to pressure applied thereto from persons stepping thereon or rolling objects passing thereover, thereby minimizing any objectionable bump hazards arising from the sealing strip. The upper surface of the upwardly arched central portion 26 of the sealing strip 25 may be ribbed or fluted, as indicated at 28, to improve the sealing characteristics of the strip upon engagement with the lower edge of the door, and the central portion 26 may be thickened relative to the remaining portion of the sealing strip as this is the portion which receives the greatest wear and abrasion.

As will be apparent from inspection of Figures 1 and 2, the sealing strip 25 is designed to be removably retained within the channel 22 by deforming the longitudinal edge portions 27 against the channel side walls 20, 21 and the bottom wall 23 to form inwardly extending right angular flanges or retaining lips 29 adapted to project inwardly along the bridge 23 from the corners of the channel 22 from which contiguous portions 30 rise in parallelism from the corners of the channel 22 along the side walls 20, 21.

A retaining plate 31 is adapted to be inserted longitudinally into the hollow defined within the semi-cylindrical sealing strip 25 between the portions 30 thereof and comprises a central region 32 adapted to bear against the upper surface of the bridge 23 forming the bottom channel wall and upwardly offset clamping flanges 33 forming rabbets of approximately the cross section of the retaining flange formations 29 of the sealing strip 25 for bearing downwardly and outwardly upon the flanges 29 to jamb them into the corners of the channel 22 and against the bottom wall 23 of the channel. To improve the clamping and retaining action of the retaining plate 31 upon the flanges 29, the lateral marginal portions of the offset clamping flanges 33 may be deformed to terminate in longitudinally extending upwardly arched channel beads, indicated at 33a, the extreme edge of which extends downwardly approximately to the plane of the central region 32 of the plate 31.

The structural variations in the several modifications disclosed resides in the manner in which the retaining plate 31 is anchored to the bridge strip 23 of the riser 11. As illustrated in Figures 1–3, the central bridging strip 23 of the threshold riser 11 is provided with a series of longitudinal spaced slots stamped or otherwise formed therein and extending preferably along the medial longitudinal axis of the bridging strip 23. The retaining plate 31 in the embodiment illustrated in Figures 1–3 is stamped at corresponding locations to provide tongues 35 therein, projecting transversely of the retaining plate 31 and being of substantially greater length than the thickness of the bridging strip 23. In the preferred embodiment, these tongues 35 are formed with inclined lateral edges 36 diverging from the necks 37 of the tongues 35 to the free ends thereof so as to exert a wedging action against the lower edges of the bounding walls of slots 34 when the tongues 35 are drawn downwardly through the slots 34 and twisted about their longitudinal axes to the positions illustrated in Figures 1 and 2 for securely clamping the flange portions 29 of the sealing strip 25 between the offset flanges 33 of the retaining plate 31 and the bottom wall 23 of the channel 22. These tongues 35 may be conveniently produced by punching a pair of longitudinally spaced circular apertures, indicated at 38 in Figure 3, interconnected by an arcuate slot 39 whose center of curvature is disposed to one side of the axis interconnecting the centers of the apertures 38 thereby providing a tongue 35 of the desired shape.

In the assembling of the sealing strip 25 onto the threshold riser 11 in upwardly arching relation within the channel 22, an elongated flat strip of flexible vinyl plastic or other flexible material is deformed by hand or by machine to approximately the form which it will finally assume in the channel 22 and fed longitudinally into the channel between the side walls 20, 21 thereof. The retaining plate 31 which is the same length as the threshold riser 11 is then inserted longitudinally within the hollow of the sealing strip 25 until it is disposed in proper registry with the threshold riser 11 with the tongues 35 thereof overlying the slots 34 in the bridging strip 23 of the riser. It is contemplated that the tongues 35 may be slightly bent downwardly during the striking operation so as to facilitate registry of the tongues with the slots. The ends of the tongues are then grasped by a tool in the hands of an assembly mechanic at the factory or on the job and are drawn completely through the slots 34 and then twisted about their necks 37 to bring the diverging edges 36 of the tongues 35 into camming relation with the bounding surfaces of the slots 34 to securely lock the central region 32 of the retaining plate 31 against the upper surface of the bridging strip 23. The upwardly offset flanges 33 of the retaining plate 31 will, during this procedure, be drawn into appropriate clamping relation with the flange portions 29 of the sealing strip 25 to securely lock the sealing strip in the position illustrated in Figures 1 and 2 and retain the same therein during a long period of use.

The sealing strip 25, when it has become worn or scuffed to a degree necessitating replacement thereof, can be readily removed from the threshold riser 11 and a new sealing strip applied by removing the entire threshold unit from the floor, turning the retaining tongues 35 to free them from locking engagement with the bounding walls of the slots 34 and withdrawing the sealing strip 25 and retaining plate 31 from the channel 22. The retaining plate 31 may be re-used if desired, although it is contemplated that new retaining plates temporarily assembled with sealing strips 25 in proper position thereon will be supplied as a replacement assembly to facilitate replacement of sealing strips in these units.

Figures 4 and 5 illustrate a modified form of the present invention involving only a change in the manner in which the retaining plate 31 is anchored to the bridging strip 23 of the threshold riser 11. As clearly illustrated in Figure 4, the bridging strip 23 at the bottom of the channel 22 and the retaining plate 31 are both provided with registering longitudinally spaced keyhole slots 40 aligned with the medial longitudinal axes of the bridging strip 23 and retaining plate 31. Each of these keyhole slots includes a large diameter circular aperture portion 41 of greater diameter than the head 42 of a bolt 43 adapted to be associated therewith, and a connecting slot portion 44, termed a keyway, of sufficient width to just accommodate the shank portion of the bolt 43.

With this embodiment, the sealing strip 25 is positioned in the channel 22 in the same manner as described in connection with the first embodiment and the retaining plate 31 is inserted into the hollow formed by the sealing strip 25 in the bottom of the channel 22 to dispose the keyhole slots 40 on the retaining plate 31 in registry with the keyhole slots in the bridging strip 23 of the threshold riser 11. The heads of the bolts 43 are then inserted through the aligned larger diameter slot portions 41 of the keyhole slots 40 until the bolt heads 42 are projected above the retaining plate 31 and the bolts 43 are then shifted to dispose the shanks thereof in the keyway portions 44. Nuts 45 may then be manually threaded onto the threaded shanks of the bolts 43 projecting below the bridging strip 23 of the threshold riser 11 to securely clamp the retaining plate on the threshold riser.

A third form of anchoring means is illustrated in Figures 6 and 7, wherein the retaining plate 31 is provided with rectangular longitudinally spaced slots 46 aligned with the medial longitudinal axis of the retaining plate 31 and the bridging strip 23 is struck to form upwardly projecting wedging anchoring tongues 47 adapted to be positioned in registry with and projected through the slots 46 in the retaining plate 31. The lock tongues 47 are formed with a web portion 48 projecting vertically from the bridging strip 23 of the threshold riser 11 for a distance less than the thickness of the central region 32 of the retaining plate 31. A wedging projection 49 of truncated triangular outline having lateral edges converging toward the free end thereof projects along the longitudinal axis of the bridging strip 23 from each web portion 48 of the tongues 47 and is disposed along an axis diverging slightly from the plane of the bridging strip 23. The free ends of the wedging projections 49 of the tongues 47 are designed to be projected through the slots 46 formed in the retaining plate 31 when the retaining plate is positioned to dispose the slots 46 so as to receive the tongues 47, and the retaining plate 31 is then driven longitudinally in the direction of the axis of the channel 22 to wedge edges of the slots 46 in intimately held relation between the downwardly facing walls of the wedging projections 49 of the tongues 47 and the upper surface of the bridging strip 23 of the threshold riser 11. This will likewise result in a secure interlock between the retaining plate 31 and the threshold riser 11 for removably retaining the sealing strip 25 in desired relation in the riser channel 22. Removal of the sealing strip in this embodiment is achieved by removing the threshold assembly 10 from the floor and striking one end of the retaining plate 31 with a tool to free the same from its wedgingly held relation by the tongues 47.

If desired, the retaining plate 31 of each of above described embodiments may be formed so that the central region 32 thereof is slightly convex to arch upwardly from the plane of the bottom wall of the channel 22 so that when the central portion of the retaining plate 31 is drawn downwardly into intimate contact with the bridging strip 23 by any of the means described in the three preferred embodiments the outwardly directed edges of the offset flanges 33 of the retaining plate 31 will be projected outwardly from their normal position, thereby clamping the wall portions 30 of the sealing strip 25 more intimately against the side walls 20, 21 of the channel 22.

While several embodiments of the invention have been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, means depending from said channel side walls for engagement with said floor surface, an elongated sealing strip of flexible sheet material deformed into an upwardly arched condition to project above the plane of said tread wall means for sealing engagement with the lower edge of a closed door mounted in said doorway and having inwardly projecting anchoring flanges along each side edge of said strip seated in said channel, an elongated retaining plate extending between said channel side walls with the lateral marginal portions thereof in overlying relation with said anchoring flanges to jamb said anchoring flanges and their contiguous sealing strip portions against the bottom and side walls of said channel, and means for removably interlocking said retaining plate with said bottom wall of said channel.

2. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, reinforcing rib means depending from said channel side walls for engagement with said floor surface, an elongated sealing strip of flexible, thin sheet material in upwardly arched semi-cylindrical form having a medial portion projecting above said tread wall means for sealing engagement with the lower edge of a closed door mounted in said doorway and pendant longitudinal edge portions terminating in inwardly projecting right angular anchoring flanges disposed adjacent said channel side walls against said bottom wall, an elongated retaining plate disposed within said channel having upwardly offset clamping flanges along the opposite lateral edges thereof for overlying and engaging said anchoring flanges and a central web portion therebetween to be disposed between said anchoring flanges in the plane of said flanges, and means for removably interlocking said retaining plates with said bottom channel wall including means for drawing said retaining plate toward said bottom channel wall.

3. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, reinforcing rib means depending from said channel side walls for engagement with said floor surface, an elongated sealing strip of flexible sheet material normally having an inverted U-shaped cross section and deformed into an upwardly arched semi-cylindrical form having a medial portion projecting above said tread wall means for sealing engagement with the lower edge of a closed door mounted in said doorway and pendant longitudinal edge portions terminating in inwardly projecting right angular anchoring flanges disposed adjacent said channel side walls against said bottom wall, an elongated sheet metal retaining plate disposed within said channel having upwardly offset clamping flanges along the opposite lateral edges thereof for overlying and engaging said anchoring flanges and a central planar web portion therebetween corresponding in width to the spacing between said anchoring flanges to be disposed between said anchoring flanges in the plane of said flanges, and means for removably interlocking said retaining plate with said bottom channel wall including means for drawing said retaining plate toward said bottom channel wall.

4. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, reinforcing rib means depending from said channel side walls for engagement with said floor surface, an elongated sealing strip of flexible sheet material having an inverted channel-shaped cross section when in the undeformed state and being deformed into an upwardly arched semi-cylindrical form having the intermediate web portion thereof projecting above said tread wall means for sealing engagement with the lower edge of a closed door mounted in said doorway and pendant longitudinal edge portions terminating in inwardly projecting right angular anchoring flanges formed by the channel sides of said strip and disposed adjacent said channel side walls against said bottom wall, an elongated sheet metal retaining plate disposed in said channel in marginally overlying relation with said anchoring flanges having a medial region to be disposed substantially in coplanar relation with said anchoring flanges and terminating laterally in upwardly offset flanges substantially complementary to said anchoring flanges and having upwardly arching channel beads along the lateral marginal portions thereof terminating in downwardly projecting edges for embracing and clamping said anchoring flanges against the bottom of said channel, and means for adjustably interlocking said retaining plate with said bottom channel wall to clamp said anchoring flanges and contiguous sealing strip portions in intimate abutment with said channel bottom and side walls.

5. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, reinforcing rib means depending from said channel side walls for engagement with said floor surface, an elongated flexible sealing strip of upwardly arched semi-cylindrical form having a medial portion projecting above said tread wall means for sealing engagement with the lower edge of a closed door mounted in said doorway and pendant longitudinal edge portions terminating in inwardly projecting right angular anchoring flanges disposed adjacent said channel side walls against said bottom wall, an elongated retaining plate disposed in said channel in marginally overlying relation with said anchoring flanges having a medial region to be disposed substantially in coplanar relation with said anchoring flanges and terminating laterally in upwardly offset flanges substantially complementary to said anchoring flanges for embracing the latter and bearing edgewise upon the contiguous portions of said sealing strip, said bottom channel wall having longitudinally spaced slots therein and said retaining plate including correspondingly spaced bendable tongues struck in the medial region thereof having lateral cam surfaces engageable with the bounding walls of said slots upon projection of said tongues therethrough and twisting the same to force said retaining plate toward said bottom channel wall to clamp said anchoring flanges and contiguous sealing strip portions in intimate abutment with said channel bottom and side walls.

6. In a door sealing threshold unit, the combination recited in claim 4 wherein said interlocking means comprises a plurality of wedging tongues projecting from said channel bottom wall and said retaining plate having apertures registrable with said tongues, said tongues being projectable through said slots into wedging engagement with the bounding walls of said slots for adjustably urging said retaining plate toward said channel bottom wall upon axial movement of said plate.

7. A door sealing threshold unit comprising an elongated riser strip of generally arch-shaped configuration in cross section having a pair of laterally spaced inclined approach walls terminating at their lower ends in bearing edges for engagement with the floor surface of a doorway, tread wall means extending between said approach walls having an upwardly opening channel therein extending the length of said riser strip and bounded by parallel vertical side walls and a bottom wall extending therebetween, reinforcing rib means depending from said channel side walls for engagement with said floor surface, an elongated flexible sealing strip of upwardly arched semi-cylindrical form having a medial portion projecting above said tread wall means for sealing engagement with the lower edge of a closed door mounted in said doorway and pendant longitudinal edge portions terminating in inwardly projecting right angular anchoring flanges disposed adjacent said channel side walls against said bottom wall, an elongated retaining plate disposed in said channel in marginally overlying relation with said anchoring flanges having a medial region to be disposed substantially in coplanar relation with said anchoring flanges and terminating laterally in upwardly offset flanges substantially complementary to said anchoring flanges for embracing the latter and bearing edgewise upon the contiguous portions of said sealing strip, said retaining plate and said channel bottom wall having registering longitudinally spaced keyhole slots each having a larger diameter portion for the projection of a head of a bolt therethrough from below said bottom wall and a connecting slot portion of reduced width for the reception of the shank of said bolt to dispose said bolt head in overlying relation with said retaining plate, and nut means on said bolt disposed below said bottom wall for adjustably urging said plate toward said bottom wall to clamp said anchoring flanges and contiguous sealing strip portions in intimate abutment with said channel bottom and side walls.

References Cited in the file of this patent
UNITED STATES PATENTS
794,424    Petit _____ July 11, 1905